United States Patent
Chen et al.

(10) Patent No.: US 10,229,618 B2
(45) Date of Patent: Mar. 12, 2019

(54) FLEXIBLE SCREEN BEING ABLE TO SWITCH BETWEEN A FLAT SHAPE AND A CURVED SHAPE AND TV SET THEREOF

(71) Applicant: SHENZHEN SKYWORTH-RGB ELECTRONIC CO., LTD., Shenzhen (CN)

(72) Inventors: Weixiong Chen, Shenzhen (CN); Lingchao Hu, Shenzhen (CN); Qianzheng Xu, Shenzhen (CN); Biao Chu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 19 days.

(21) Appl. No.: 15/507,782

(22) PCT Filed: Mar. 14, 2016

(86) PCT No.: PCT/CN2016/076230
§ 371 (c)(1),
(2) Date: Mar. 1, 2017

(87) PCT Pub. No.: WO2017/117864
PCT Pub. Date: Jul. 13, 2017

(65) Prior Publication Data
US 2018/0226001 A1  Aug. 9, 2018

(30) Foreign Application Priority Data

Jan. 6, 2016 (CN) .......................... 2016 1 0002727

(51) Int. Cl.
*G09F 9/30* (2006.01)
*G09F 19/02* (2006.01)
(Continued)

(52) U.S. Cl.
CPC .......... *G09F 9/301* (2013.01); *G09F 15/0031* (2013.01); *G09F 19/02* (2013.01); *H04N 5/64* (2013.01); *H05K 5/02* (2013.01)

(58) Field of Classification Search
None
See application file for complete search history.

(56) References Cited

U.S. PATENT DOCUMENTS 9,081,540 B1 * 7/2015 Cho .................... G06F 1/1601
9,182,620 B1 * 11/2015 Yu ....................... G06F 1/1601
(Continued)

FOREIGN PATENT DOCUMENTS

CN    201056972 Y    5/2008
CN    103544889 A    1/2014
(Continued)

OTHER PUBLICATIONS

The World Intellectual Property Organization (WIPO) International Search Report for PCT/CN2016/076230 dated Sep. 26, 2016 5 Pages.

*Primary Examiner* — Elmito Breval
(74) *Attorney, Agent, or Firm* — Anova Law Group, PLLC

(57) ABSTRACT

The present invention provides a flexible screen being able to switch between a flat shape and a curved shape and TV set thereof, comprising: a flexible screen and a power mechanism arranged on one side of the flexible screen, applied to driving the flexible screen to switch between a flat shape and a curved shape; the power mechanism comprises: a telescoping arm and a telescoping power unit arranged on the telescoping arm and applied to driving the telescoping arm elongating and contracting following the horizontal direction. The user may adjust the curved or flat state of the flexible screen through a remote control of the remoter or through a manual adjustment of the ring handle: when a (Continued)

view effect of the curved screen is wanted, through pressing the button for curved screen in the remoter or through rotating the ring handle, switching the flexible screen from flat to curved, and a good view effect is achieved; or through pressing the button for flat screen in the remoter or through rotating the ring handle, switching the flexible screen from curved to flat, to satisfying the view of a plurality of viewers.

14 Claims, 4 Drawing Sheets

(51) Int. Cl.
*H04N 5/64* (2006.01)
*H05K 5/02* (2006.01)
*G09F 15/00* (2006.01)

(56) References Cited

U.S. PATENT DOCUMENTS

| | | | | |
|---|---|---|---|---|
| 9,307,658 | B2* | 4/2016 | Song | H05K 5/0217 |
| 9,645,605 | B2* | 5/2017 | Park | H04N 5/64 |
| 9,980,399 | B2* | 5/2018 | Cho | G09F 9/301 |
| 2012/0224347 | A1* | 9/2012 | Hayakawa | F16M 11/08 |
| | | | | 361/807 |
| 2013/0114193 | A1* | 5/2013 | Joo | F16M 11/08 |
| | | | | 361/679.01 |
| 2013/0155655 | A1* | 6/2013 | Lee | H05K 5/03 |
| | | | | 362/97.1 |
| 2013/0207946 | A1* | 8/2013 | Kim | G09G 3/3225 |
| | | | | 345/204 |
| 2014/0198465 | A1* | 7/2014 | Park | H05K 5/0226 |
| | | | | 361/749 |
| 2014/0226266 | A1* | 8/2014 | Kang | H01L 51/0097 |
| | | | | 361/679.01 |
| 2014/0376163 | A1* | 12/2014 | Song | H04N 5/64 |
| | | | | 361/679.01 |
| 2015/0009635 | A1* | 1/2015 | Kang | G09F 9/301 |
| | | | | 361/749 |
| 2015/0035812 | A1* | 2/2015 | Shin | G09G 3/3688 |
| | | | | 345/204 |
| 2015/0185761 | A1* | 7/2015 | Song | G06F 1/1601 |
| | | | | 361/679.21 |
| 2015/0192952 | A1* | 7/2015 | Jung | G06F 1/1601 |
| | | | | 361/747 |
| 2015/0195932 | A1* | 7/2015 | Lee | H05K 5/0217 |
| | | | | 361/749 |
| 2016/0127674 | A1* | 5/2016 | Kim | G09G 5/003 |
| | | | | 348/739 |
| 2016/0295711 | A1* | 10/2016 | Ryu | G09F 9/301 |

FOREIGN PATENT DOCUMENTS

| | | |
|---|---|---|
| CN | 103763409 A | 4/2014 |
| CN | 103814403 A | 5/2014 |
| CN | 103943031 A | 7/2014 |
| CN | 103971608 A | 8/2014 |
| WO | 2013162830 A1 | 10/2013 |

* cited by examiner

FLEXIBLE SCREEN BEING ABLE TO SWITCH BETWEEN A FLAT SHAPE AND A CURVED SHAPE AND TV SET THEREOF

CROSS-REFERENCES TO RELATED APPLICATIONS

This application is a national stage application of PCT Patent Application No. PCT/CN2016/076230, filed on Mar. 14, 2016, which claims priority to Chinese Patent Application No. 201610002727.2, filed on Jan. 6, 2016, the content of all of which is incorporated herein by reference.

FIELD OF THE INVENTION

The present invention relates to the field of TV set technology, and, more particularly, to a flexible screen being able to switch between a flat shape and a curved shape and TV set thereof.

BACKGROUND

Currently, a TV set used at home is a common flat-screen TV set, which is suitable for a plurality of users without providing a best view angle for each user, thus when a user wants to improve a view experience, he has to rearrange a curved-screen TV set with a certain curved-shape screen (such as an OLED TV set), to provide the user a better view effect, however, the curved-screen TV set does not fit for a plurality of users to watch. Neither the common flat-screen TV set nor the curved-screen TV set may satisfy a plurality of users watching and providing a good view effect at a same time, although a common curved-screen TV set adopts a flexible screen which is bendable, it may not switch between a curved-screen and a flat-screen, so as not being able to satisfy the user a plurality of different requirements at different time.

Therefore, the current technology needs to be improved and developed.

BRIEF SUMMARY OF THE DISCLOSURE

According to the above described defects, the purpose of the present invention is providing a flexible screen being able to switch between a flat shape and a curved shape and TV set thereof, in order to solve the problems in the prior arts that an existing common TV set may not switch between a flat screen and a curved screen, so as to satisfy a user's different requirements at different time.

In order to achieve the above mentioned goals, the technical solution of the present invention to solve the technical problems is as follows:

A flexible screen being able to switch between a flat shape and a curved shape, wherein, it comprises: a flexible screen and a power mechanism arranged on one side of the flexible screen, applied to driving the flexible screen to switch between a flat shape and a curved shape; the power mechanism comprises: a telescoping arm and a telescoping power unit arranged on the telescoping arm and applied to driving the telescoping arm elongating and contracting following a horizontal direction.

The flexible screen being able to switch between a flat shape and a curved shape, wherein, the telescoping arm comprises a first telescoping arm and a second telescoping arm with a same structure, arranged in parallel; the telescoping power unit is arranged in between the first telescoping arm and the second telescoping arm.

The flexible screen being able to switch between a flat shape and a curved shape, wherein, the telescoping power unit comprises a first rack and a second rack arranged on a pair of opposite faces of the first telescoping arm and the second telescoping arm respectively, while both teeth positions are opposite; and a worm drive unit, applied to driving the first rack and the second rack to make a reverse movement.

The flexible screen being able to switch between a flat shape and a curved shape, wherein, the worm drive unit comprises a worm and a worm gear matching each other; a gear, extending to and arranged at a center of the worm gear, applied to intermeshing with the first rack and the second rack for driving.

The flexible screen being able to switch between a flat shape and a curved shape, wherein, the worm gear connects together with the gear as one.

The flexible screen being able to switch between a flat shape and a curved shape, wherein, one end of the worm has a motor arranged, applied to driving the worm to rotate.

The flexible screen being able to switch between a flat shape and a curved shape, wherein, the power mechanism is fixed by a plurality of screws to a center of one side of the flexible screen; a plurality of screw columns with a same height are arranged in the flexible screen, applied to keeping a curvature of the flexible screen consistent in bending; the flexible screen further comprises a positioning socket, applied to fixing the worm and the worm gear, a height of the positioning socket equals to that of the screw columns.

The flexible screen being able to switch between a flat shape and a curved shape, wherein, a plurality of first through holes and second through holes are arranged in the telescoping arm alternatively, applied for the screws to penetrating; the first through holes are arranged in one end of the telescoping arm away from the telescoping power unit, and an inner surface of the first through hole fits to an outer surface of the screw; a plurality of the second through holes are arranged alternatively between one end of the telescoping arm dose to the telescoping power unit and the first through holes, while the second through hole is wider than an external diameter of the screw.

A TV set, wherein, it comprises the flexible screen being able to switch between a curved shape and a flat shape.

Benefits. Through arranging a telescopic arm and a telescopic power unit on one side of the flexible screen, a user may adjust a curved or flat state of the flexible screen: when a view effect of the curved screen is wanted, in a case of a length of the flexible screen unchanged, through a telescoping power unit driving a telescoping arm to elongate, the flexible screen is switched from a flat screen to a curved screen, and achieving a good view effect; also, the flexible screen may be changed from curved to flat, through the telescoping power unit driving the telescoping arm to contract, for a plurality of people to watch, thus a switch of the TV set between a curved screen and a flat screen is achieved, in order to satisfy different requirements of the user at different time.

DETAILED DESCRIPTION OF EMBODIMENTS

The present invention provides a flexible screen being able to switch between a flat shape and a curved shape and TV set thereof, in order to make the purpose, technical solution and the advantages of the present invention clearer and more explicit, further detailed descriptions of the present invention are stated here, referencing to attached drawings of FIG. 1~FIG. 9, and some preferred embodiments of the present invention. It should be understood that the detailed embodiments of the invention described here are used to explain the present invention only, instead of limiting the present invention.

A flexible screen owns a character of bendable and a good flexibility, which is also called an OLED screen. The flexible screen being able to switch between a flat shape and a curved shape, may be applied to a plurality of terminal devices including a cell phone, a TV set, a tablet and more, acting as a display screen of the terminal devices.

Figure 1:
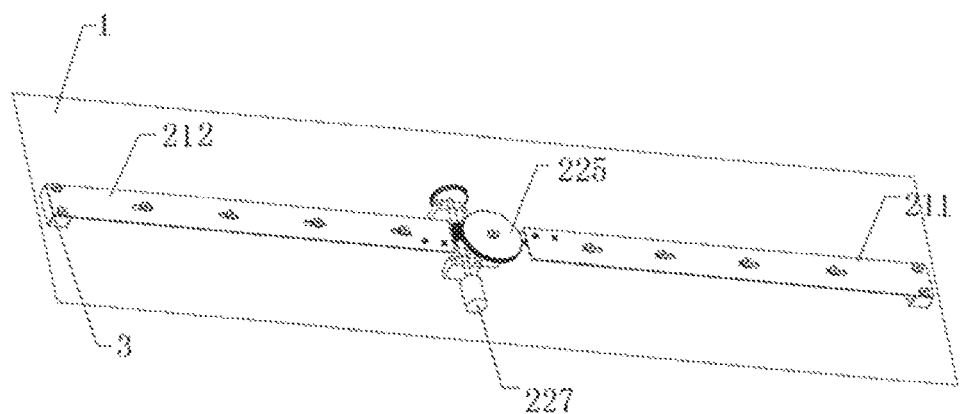
FIG. 1 illustrates a schematic diagram of a preferred embodiment on a flexible screen being able to switch between a flat shape and a curved shape as provided in the present invention.

Referencing to FIG. 1, which illustrates a schematic diagram of a preferred embodiment on the flexible screen being able to switch between a flat shape and a curved shape as provided in the present invention, which comprises: a flexible screen 1 and a power mechanism arranged on one side of the flexible screen 1, applied to driving the flexible screen 1 to switch between the flat shape and the curved shape.

In a real implementation, a face of the flexible screen 1 for the user to view, is called a front face of the flexible screen 1, and a face opposite to the front face of the flexible screen 1 is called a back face, the power mechanism is arranged on the back face of the flexible screen 1, and locating at a center of the flexible screen 1, which makes the power mechanism be able to drive the whole flexible screen 1 to make a consistent switch between the flat shape and the curved shape, instead of generating a problem of making the switch inconsistent between the flat shape and the curved shape of the flexible screen 1, due to not locating the power mechanism at the center of the flexible screen 1, that is, only one end of the flexible screen 1 makes the switch, while other end has a tiny deformation only, and that makes the user not being able to watch normally.

Figure 2:
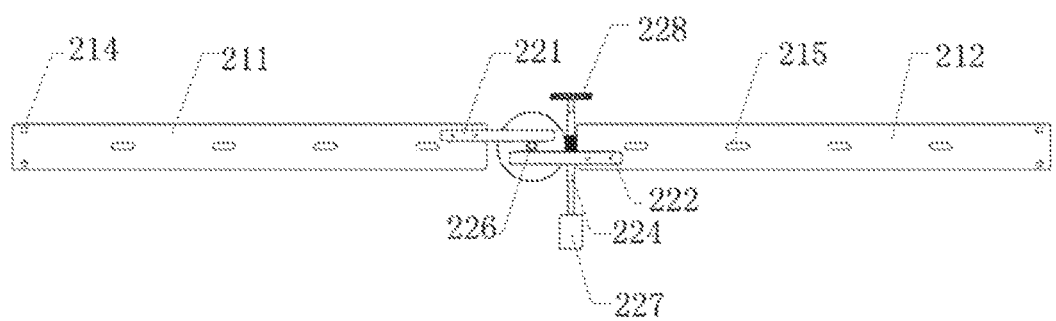
FIG. 2 illustrates a schematic diagram of a preferred embodiment on a power mechanism in the flexible screen being able to switch between a flat shape and a curved shape as provided in the present invention.

Shown as FIG. 2, it illustrates a schematic diagram of a preferred embodiment on the power mechanism in the flexible screen being able to switch between a flat shape and a curved shape as provided in the present invention. The power mechanism comprises: a telescoping arm and a telescoping power unit, the telescoping power unit connects to the telescoping arm, when the telescoping power unit runs, it may drive the telescoping arm connecting with it to generate a horizontal elongation or contraction, so as to drive the flexible screen 1 curved following the elongation of the telescoping arm, and flat following the contraction of the telescoping arm.

Figure 3:
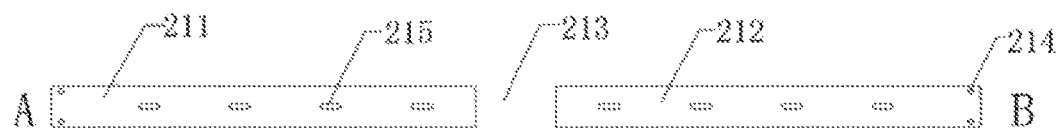
FIG. 3 illustrates a schematic diagram of a preferred embodiment on a telescoping arm in the flexible screen being able to switch between a flat shape and a curved shape as provided in the present invention.

Further, as shown in FIG. 3, it illustrates a schematic diagram of a preferred embodiment on the telescoping arm in the flexible screen being able to switch between a flat shape and a curved shape as provided in the present invention. The telescoping arm comprises a first telescoping arm 211 and a second telescoping arm 212 with a same structure, the first telescoping arm 211 and the second telescoping arm 212 are arranged in parallel, that is, the first telescoping arm 211 and the second telescoping arm 212 are arranged in a straight line horizontally, and a first gap 213 is between the first telescoping arm 211 and the second telescoping arm 212, the telescoping power unit is arranged in the first gap 213 between the first telescoping arm 211 and the second telescoping arm 212. Preferably, the telescoping arm is a steel disc.

In the present invention, a change of a length of the telescoping arm is decided by an increase or decrease of a length of the first gap 213, that is, if the length of the first gap 213 is increasing, a total length between a top end A of the first telescoping arm 211 and a top end B of the second telescoping arm 212 is elongating; if the length of the first gap 213 is decreasing, the total length between the top end A of the first telescoping arm 211 and the top end B of the second telescoping arm 212 is contracting, thus the first telescoping arm 211 and the second telescoping arm 212 generates a reverse movement under a driven by the telescoping power unit. When the length of the first gap 213 increases, that is, under the driven by the telescoping power unit, when both of the first telescoping arm 211 and the second telescoping arm 212 are moving away from each other, both of the telescoping arms drive the flexible screen 1, wherein, the first telescoping arm 211 applies an external force against a direction of the second telescoping arm 212 to a contacted part of the flexible screen 1, the second telescoping arm 212 applies an external force against a direction of the first telescoping arm 211 to a contacted part of the flexible screen 1, while the length of the flexible screen 1 keeps unchanged, thus a curvature of the flexible screen 1 is changed by the external forces generated by the elongation of the telescopic arms, that is, the flexible screen 1 becomes curved. Now, if the length of the first gap 213 decreases, that is, under the driven by the telescoping power unit, when both of the first telescoping arm 211 and the second telescoping arm 212 are moving towards each other, both of the telescoping arms drive the flexible screen 1, wherein, the first telescoping arm 211 applies an external force towards the direction of the second telescoping arm 212 to the contacted part of the flexible screen 1, the second telescoping arm 212 applies an external force towards the direction of the first telescoping arm 211 to the contacted part of the flexible screen 1, while the length of the flexible screen 1 keeps unchanged, thus a curvature of the flexible screen 1 is changed by the external forces generated by a contraction of a length of the telescopic arms, that is, the flexible screen 1 becomes flat.

Figure 4:
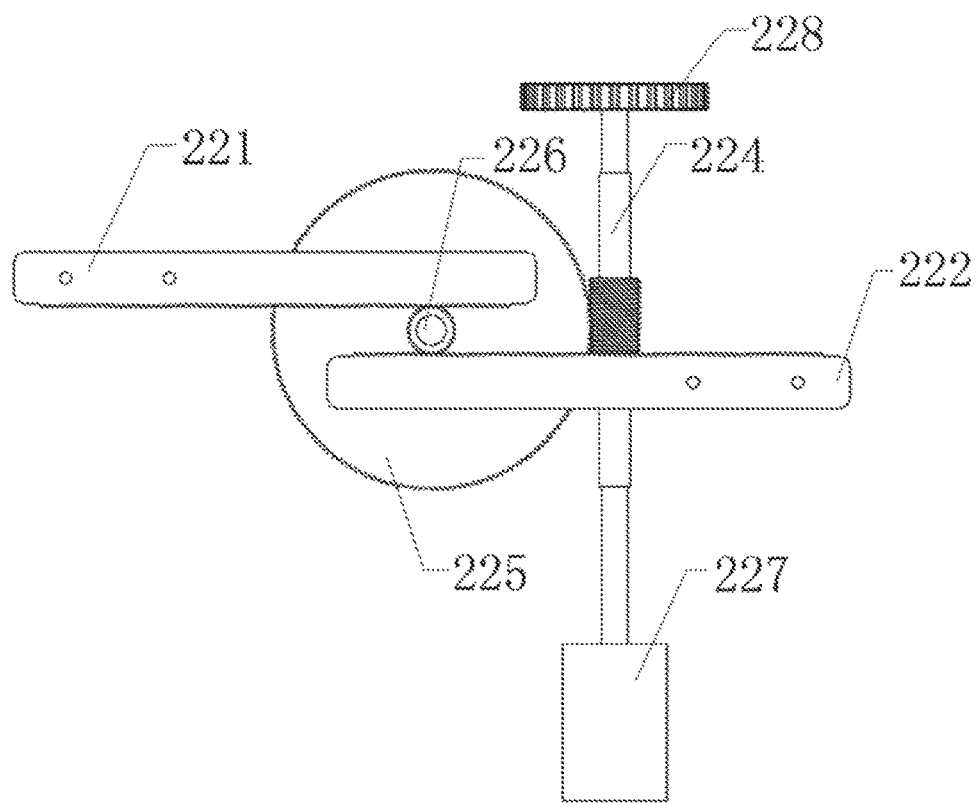
FIG. 4 illustrates a schematic diagram of a preferred embodiment on a telescoping power unit in the flexible screen being able to switch between a flat shape and a curved shape as provided in the present invention.

Further, shown as FIG. 4, it illustrates a schematic diagram of a preferred embodiment on the telescoping power unit in the flexible screen being able to switch between a flat shape and a curved shape as provided in the present invention. The telescoping power unit comprises a first rack 221 and a second rack 222 arranged on a pair of opposite faces of the first telescoping arm and the second telescoping arm respectively, while both teeth positions are opposite, wherein, one end of the first rack 221 is fixed by a plurality of screws onto the first telescoping arm 211, and locates on a face of the first telescoping arm 211 facing to the flexible screen 1, while another end locates in the first gap 213; one end of the second rack 222 is fixed onto the second telescoping arm 212, and locates on a face of the second telescoping arm 212 facing to the flexible screen 1, while another end locates also in the first gap 213. Preferably, the first rack 221 locates above the second rack 222 in parallel, there is a second gap between the end of the first rack 221 locating in the first gap 213 and the end of the second rack 222 locating in the first gap 213. Further, the teeth positions of the first rack 221 and the second rack 222 are opposite to each other, that is, a tooth of the first rack 221 locates at its lower surface; a tooth of the second rack 222 locates at its upper surface.

The telescoping power unit further comprises a worm drive unit, applied to driving the first rack 221 and the second rack 222 to make a reverse movement. Since the first rack 221 screws and fixes to the first telescoping arm 211, the second rack 222 screws and fixes to the second telescoping arm 212, thus, when the first rack 221 and the second rack 222 are making the reverse movement under a driven by the worm drive unit, the first telescoping arm 211 and the second telescoping arm 212 generate a same movement at a same direction, under the driven by the reverse movement of the first rack 221 and the second rack 222, and realize the increase or decrease of the total length of the telescoping arm, so as to bend or stretch the flexible screen 1.

Wherein, the worm drive unit comprises: a worm 224 and a worm gear 225 matching each other; a gear 226, extending to and arranged at a center of the worm gear 225, applied to intermeshing with the first rack 221 and the second rack 222 for driving. The worm gear 225 and the worm 224 match each other, and locate in the first gap 213, when the worm 224 rotates, the matched worm gear 225 generates a rotation movement at a same time. A gear 226 is arranged at an extension of the center of the worm gear 225, that is, an external surface of the gear 226 exceeds that of the worm gear 225, preferably, the worm gear 225 connects together with the gear 226 as one, and a part of the gear 226 exceeding the external surface of the worm gear 225 locates in the second gap, while the gear 226 matches the teeth at the lower surface of the first rack 221 and the teeth at the upper surface of the second rack 222.

When the worm gear 225 is rotating and driven by the worm 224, the gear 226 arranged together with the worm gear 225 generates a same direction rotation with the worm gear 225. Preferably, the worm 224 is a right rotation worm, that is, when the worm 224 is rotating in a clockwise direction, the worm gear 225 is rotating in a counter-clockwise direction, and the gear 226 generates a same counter-clockwise rotation as the worm gear 225, and when the gear 226 is generating the counter-clockwise rotation, both the first rack 221 and the second rack 222 generate a movement away from each other, and now the total length of the telescoping arm increases, both the telescoping arms are applying external forces to the flexible screen 1, wherein, the first telescoping arm 211 applies an external force against the direction of the second telescoping arm 212 to the contacted part of the flexible screen 1, the second telescoping arm 212 applies an external force against the direction of the first telescoping arm 211 to the contacted part of the flexible screen 1, while due to the length of the flexible screen 1 keeps unchanged, thus, the curvature of the flexible screen 1 is changed by the external forces generated by the elongation of the telescopic arms, that is, the flexible screen 1 becomes curved.

when the worm 224 is rotating in a counter-clockwise direction, the worm gear 225 is rotating in a clockwise direction, and the gear 226 generates a same clockwise rotation as the worm gear 225, and when the gear 226 is generating the clockwise rotation, both the first rack 221 and the second rack 222 generate a movement towards each other, and now the total length of the telescoping arm decreases, both the telescoping arms are applying external forces to the flexible screen 1, wherein, the first telescoping arm 211 applies an external force towards the direction of the second telescoping arm 212 to the contacted part of the flexible screen 1, the second telescoping arm 212 applies an external force towards the direction of the first telescoping arm 211 to the contacted part of the flexible screen 1, so as to stretch the curved flexible screen 1.

Further, one end of the worm 224 is arranged with a motor 227 applied to driving the worm 224 to rotate. Preferably, the motor 227 is arranged at a bottom end of the worm 224.

If the power mechanism is biased towards one side of the flexible screen 1, for example, it is biased towards a left side of the flexible screen 1, then when the telescoping arm drives the flexible screen 1 curved, the flexible screen 1 will generate a phenomenon of a curvature on the left larger than that on the right, which is not suitable for the view to watch, thus, preferably, the power mechanism is connected to a center of one side of the flexible screen 1 by a screw, which makes the flexible screen 1 generate a same curvature left and right, under the driven by the power mechanism arranged at the center of one side of the flexible screen 1, thus provides the user a better view range of the curved screen.

Further, in order to keep the curvature of the flexible screen 1 consistent during bending, the present invention arranges a plurality of screw columns 3 on the flexible screen 1. Shown as FIG. 8, it illustrates a schematic diagram of a preferred embodiment on a back structure of the flexible screen in the flexible screen being able to switch between a flat shape and a curved shape as provided in the present invention. Due to the power mechanism is fixed by a plurality of screws to one side of the flexible screen 1, thus a plurality of the screw columns 3 are arranged on the flexible screen 1 to separate the power mechanism and the flexible screen 1, that is, a plurality of screw columns 3 are separating in between the power mechanism and the flexible screen 1, with an equal height, thus, when the power mechanism driving the flexible screen 1 curved, due to arranging the screw columns 3 with a same height between the power mechanism and the flexible screen 1, the curvature of the whole flexible screen 1 is able to be kept a same, thus giving the user a best view angle.

A plurality of first through holes 214 and second through holes 215 are arranged on the telescoping arm alternatively, applied for the screws to penetrating; the first through holes 214 are arranged in one end of the telescoping arm away from the telescoping power unit, and an inner surface of the first through hole 214 fits to an outer surface of the screw; a plurality of the second through holes 215 are arranged alternatively between one end of the telescoping arm close to the telescoping power unit and the first through holes 214, while the second through hole 214 is wider than an external diameter of the screw.

There is a plurality of recesses arranged in the screw columns 3, applied for screwing. In order to make the flexible screen 1 be able to achieve a switch between the curved shape and the flat shape under the driving of the telescoping arm, it is needed to fixedly connect both ends of the telescoping arm to the flexible screen 1, while keeping a connection between both ends of the telescoping arms and the flexible screen 1 unlocked, a space for the telescoping arm being able to make a movement of both an elongation and a contraction should be preserved, thus, arranging a plurality of first through holes 214 at the end of the telescoping arm away from the telescoping power unit, and the inner surface of the first through hole 214 fits to the outer surface of the screw, that is, the first through hole 214 just wraps the screw tightly, and fixes the end of the telescoping arm away from the telescoping power unit tightly onto the flexible screen 1; arranging a plurality of second through holes 215 in the telescoping arm between the end dose to the telescoping power unit and the first through holes 214, the second through holes 215 are larger than the out diameter of the screw, preferably, the second through holes 215 are kidney shaped holes being able to avoid the telescoping arm locked, and keep the telescoping arm movable horizontally.

Figure 5:
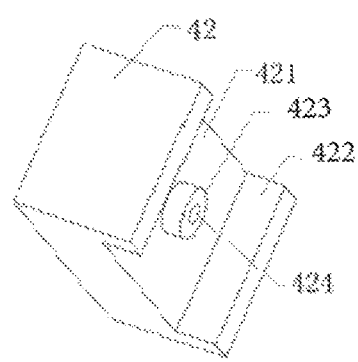
FIG. 5 illustrates a schematic diagram of a preferred embodiment on a positioning cap in the flexible screen being able to switch between a flat shape and a curved shape as provided in the present invention.
Figure 6:
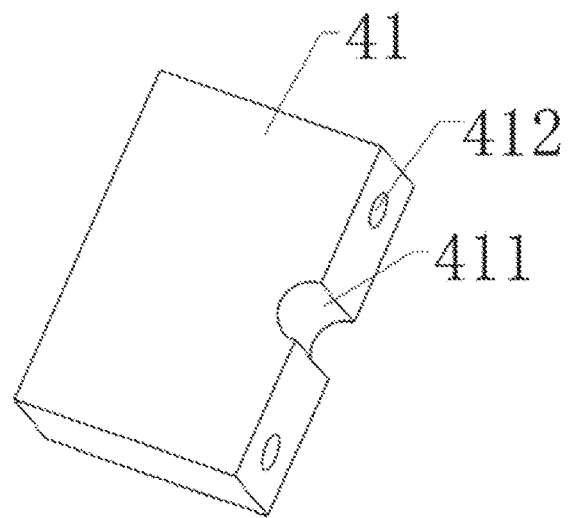
FIG. 6 illustrates a schematic diagram of a preferred embodiment on a first positioning socket in the flexible screen being able to switch between a flat shape and a curved shape as provided in the present invention.

Further, the flexible screen 1 has a plurality of positioning sockets 4 arranged, applied to fixing the worm 224 and the worm gear 225, wherein, two first positioning sockets 41 are applied to fixing the worms 224, and a second positioning socket 42 is applied to fixing the worm gear 225. The worm 224 is fixed onto one side of the flexible screen 1 through the first positioning sockets 41 and a plurality of positioning caps 43 matching the first positioning sockets 41. The two first positioning sockets 41 are arranged above and below the flexible screen 1, a first groove 41 is arranged in a middle of the first positioning socket 41, applied to matching the worm 224, each end of the first positioning socket 41 has a second groove 412 arranged, applied to fixing the screw, as shown in FIG. 5 and FIG. 6, wherein, FIG. 5 illustrates a schematic diagram of a preferred embodiment on the positioning cap in the flexible screen being able to switch between a flat shape and a curved shape as provided in the present invention; FIG. 6 illustrates a schematic diagram of a preferred embodiment on the first positioning socket in the flexible screen being able to switch between a flat shape and a curved shape as provided in the present invention. Each end of the positioning cap has a third through hole 431 arranged, applied for the screw passing through, positions of the third through hole 431 and the second groove 412 are matching each other. Placing the worm 224 into the first groove 411, after matching and placing the positioning cap and the first positioning socket 41, fixing the worm 224 tightly onto one side of the flexible screen 1, by the screw passing through the third through hole in the positioning cap and matching the second groove 412 in the first positioning socket 41 before tightening.

Figure 7:
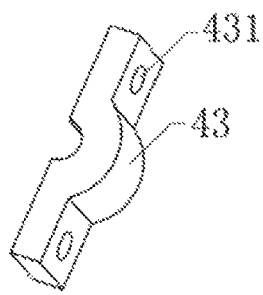
FIG. 7 illustrates a schematic diagram of a preferred embodiment on a second positioning socket in the flexible screen being able to switch between a flat shape and a curved shape as provided in the present invention.
Figure 8:
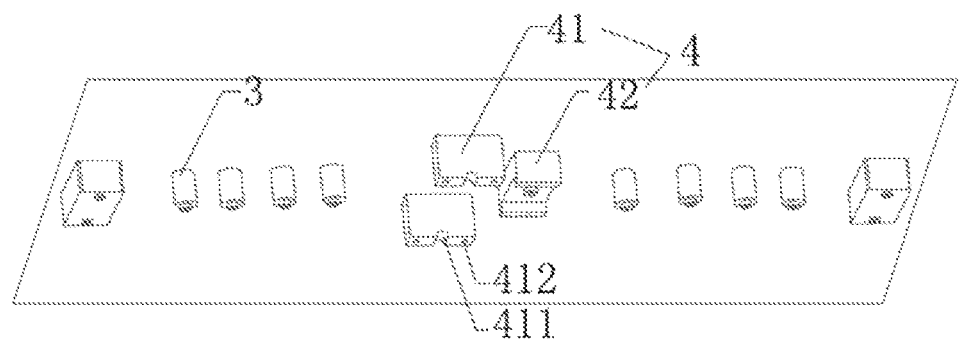
FIG. 8 illustrates a schematic diagram of a preferred embodiment on a back structure of the flexible screen in the flexible screen being able to switch between a flat shape and a curved shape as provided in the present invention.

Shown as FIG. 7, it illustrates a schematic diagram of a preferred embodiment on the second positioning socket in the flexible screen being able to switch between a flat shape and a curved shape as provided in the present invention. The second positioning socket 42 applied to fixing the worm gear 225 comprises: a bottom board 421, fixedly connecting to the flexible screen 1; a positioning bar 422 arranged on both upper and lower sides of the bottom board, applied to avoid any displacements of the first rack 221 and the second rack 222; and a positioning column 423 arranged at a center of the bottom, applied to fixing a rotation center of the worm gear 225.

Figure 9:
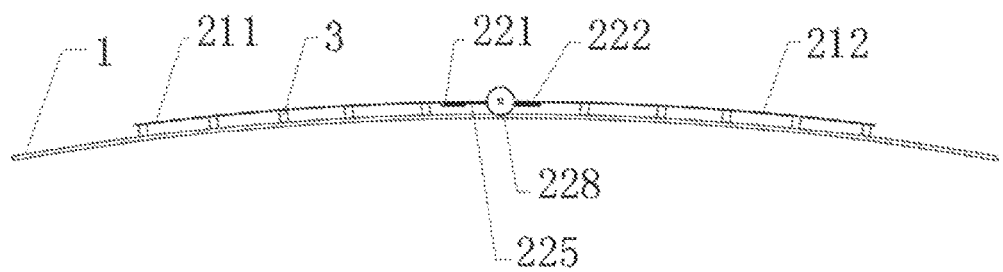
FIG. 9 illustrates a top view of the flexible screen being able to switch between a flat shape and a curved shape, when in a curved state, as provided in the present invention.
Figure 10:
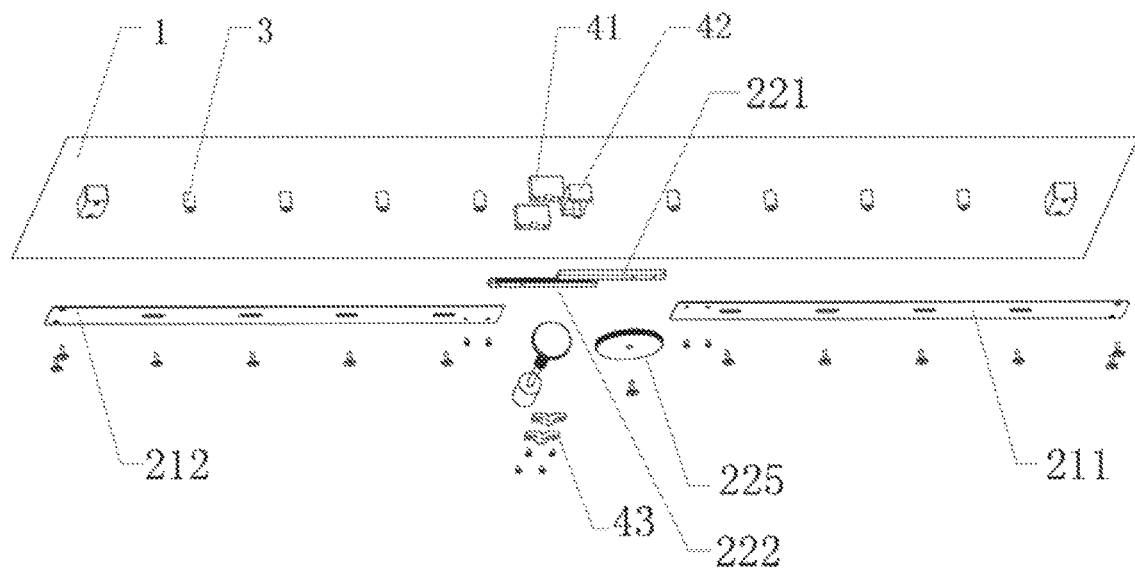
FIG. 10 illustrates an explored view on the flexible screen being able to switch between a flat shape and a curved shape as provided in the present invention.

A center of the positioning column has a recess 424, applied to fixing the screw; due to the middle part of the worm gear 225 extending out and having the gear 226 arranged, thus, a through hole is arranged at the center of the worm gear 225, which is applied for a screw to passing through, while passing through the center of the worm gear 225 and the gear 226. Since the first rack 221 is arranged above the gear 226, the second rack 222 is arranged below the gear 226, and the first rack 221 and the second rack 222 are intermeshing each other for driving, both the first rack 221 and the second rack 222 has only one section fixedly connected to the telescoping arm, thus during an intermeshing and driving process between the first rack 221, the second rack 222 and the gear 226, an outer expansion may occur, or, an upward or downward offset may be generated, in the present invention, arranging the positioning bar at the second positioning socket 42 applied to fixing the worm gear 225, may avoid effectively the first rack 221 and the second rack 222 moving vertically, and keep the first rack 221 and the second rack 222 always intermeshing with the gear 226, thus keep the telescoping power unit running normally. Shown as FIG. 9 and FIG. 10, wherein, FIG. 9 illustrates a top view of the flexible screen being able to switch between a flat shape and a curved shape, when it is in the curved state, as provided in the present invention, FIG. 10 illustrates an explored view on the flexible screen being able to switch between a flat shape and a curved shape as provided in the present invention.

The present invention further provides a TV set, which comprises the flexible screen being able to switch between a flat shape and a curved shape. Preferably, the present invention further provides a remoter applied to controlling the TV set by signals; the TV set further includes an MCU controller chip, arranged inside the TV set, and applied to executing signal transmission with the remoter and the motor 227, the MCU controller chip connects to the motor 227 by electricity.

Further, the remoter comprises a button for curved screen and a button for flat screen. When the user presses down the button for curved screen in the remover, the MCU controller chip in the TV set controls the motor 227 connecting with the worm 224 rotate in a clockwise direction, to drive the worm 224 to generate a movement of clockwise rotation, and the flexible screen 1 becomes curved, under the external forces generated by the telescoping arm elongation, and a TV set with curved screen is generated; when the user presses down the button for flat screen in the remover, the MCU controller chip in the TV set controls the motor 227 connecting with the worm 224 rotate in a counter-clockwise direction, to drive the worm 224 to generate a movement of counter-clockwise rotation, and the flexible screen 1 becomes flat, under the external forces generated by the telescoping arm contraction, and a TV set with flat screen is generated. The user may achieve a switch for the TV set between a curved screen and a flat screen, through a simple operation to the buttons in the remoter, which is convenient and fast.

When the current state of the TV set is the curved screen, the button for curved screen in the remoter is in an unavailable state, and the button for flat screen in the remoter is in an available state, when the user tries to use the button for curved screen, the remoter will give out a spoken notice to the user, reminding the user that the button for curved screen is currently unavailable; when the current state of the TV set is the flat screen, the button for curved screen in the remoter is in an available state, and the button for flat screen in the remoter is in an unavailable state, when the user tries to use the button for flat screen, the remoter will give out a spoken notice to the user, reminding the user that the button for flat screen is currently unavailable.

Preferably, the motor 227 is arranged on a bottom of the worm 224, a ring handle 228 is further arranged at a top end of the worm 224, the ring handle 228 extends out of an external surface of the TV set, when the ring handle 228 is rotating, the worm 224 generates a same direction rotation with the ring handle 228, that is, the user may adjust the switch of the flexible screen 1 between a curved screen and a flat screen himself, through rotating the ring handle 228. When the flexible screen 1 is in a flat screen state, if the user rotates the ring handle 228 in a clockwise direction, the flexible screen 1 will switch from a flat screen into a curved screen; if the user rotates the ring handle 228 in a counter-clockwise direction, now the ring handle 228 will not generate any movement of rotation, that is, the user may not rotate the ring handle 228. When the flexible screen 1 is in a curved screen state, if the user rotates the ring handle 228 in a counter-clockwise direction, the flexible screen 1 will switch from a curved screen into a flat screen; if the user rotates the ring handle 228 in a clockwise direction, now the ring handle 228 will not generate any movement of rotation, that is, the user may not rotate the ring handle 228.

All above, the present invention provides a flexible screen being able to switch between a flat shape and a curved shape and TV set thereof, which comprises: a flexible screen and a power mechanism arranged on one side of the flexible screen, applied to driving the flexible screen to switch between a flat shape and a curved shape; the power mechanism comprises: a telescoping arm and a telescoping power unit arranged on the telescoping arm and applied to driving the telescoping arm elongating and contracting following the horizontal direction. The user may adjust the curved or flat state of the flexible screen through a remote control of the remoter or through a manual adjustment of the ring handle: when a view effect of the curved screen is wanted, through pressing the button for curved screen in the remoter or through rotating the ring handle, switching the flexible screen from flat to curved, and a good view effect is achieved; or through pressing the button for flat screen in the remoter or through rotating the ring handle, switching the flexible screen from curved to flat, to satisfying the view of a plurality of viewers.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A screen being able to switch between a flat shape and a curved shape, comprising:
    a flexible screen; and
    a power mechanism arranged on one side of the flexible screen for driving the flexible screen to switch between the flat shape and the curved shape, the power mechanism comprising:
        a telescoping arm;
        a telescoping power unit coupling the telescoping arm for driving the telescoping arm elongating and contracting following a horizontal direction; and
        a positioning socket connected to the flexible screen for installing the telescoping power unit, comprising:
            two positioning bars arranged on upper and lower sides of the positioning socket to limit a vertical movement of the telescoping arm.

2. The screen being able to switch between a flat shape and a curved shape according to claim 1, wherein, the telescoping arm comprises a first telescoping arm and a second telescoping arm with a same structure, arranged in parallel; the telescoping power unit is arranged in between the first telescoping arm and the second telescoping arm.

3. The screen being able to switch between a flat shape and a curved shape according to claim 2, wherein, the first telescoping arm comprises a first rack having a first teeth and the second telescoping arm comprises a second rack having a second teeth; the first rack and the second rack are arranged on a pair of opposite faces of the first telescoping arm and the second telescoping arm respectively; and a worm drive unit, applied to driving the first rack and the second rack to make a reverse movement.

4. The screen being able to switch between a flat shape and a curved shape according to claim 3, wherein, the worm drive unit comprises a worm and a worm gear matching each other; a gear, extending to and arranged at a center of the worm gear, applied to intermeshing with the first rack and the second rack for driving.

5. The screen being able to switch between a flat shape and a curved shape according to claim 4, wherein, the worm gear connects together with the gear as an assembly.

6. The screen being able to switch between a flat shape and a curved shape according to claim 4, wherein, one end of the worm has a motor arranged, applied to driving the worm to rotate.

7. The screen being able to switch between a flat shape and a curved shape according to claim 4, wherein, the power mechanism is fixed by a plurality of screws to a center of one side of the flexible screen; a plurality of screw columns with a same height are arranged in the flexible screen, applied to keeping a curvature of the flexible screen consistent in bending; the position socket is configured to fix the worm and the worm gear, a height of the positioning socket equals to the height of the screw columns.

8. The screen being able to switch between a flat shape and a curved shape according to claim 7, wherein, a plurality of first through holes and second through holes are arranged in the telescoping arm alternatively, applied for the screws to penetrating; the first through holes are arranged in one end of the telescoping arm away from the telescoping power unit, and an inner surface of the first through hole fits to an outer surface of the screw; a plurality of the second through holes are arranged alternatively between one end of the telescoping arm close to the telescoping power unit and the first through holes, while the second through hole is wider than an external diameter of the screw.

9. A TV set having a screen being able to switch between a flat shape and a curved shape, wherein the screen comprises:
 a flexible screen; and
 a power mechanism arranged on one side of the flexible screen for driving the flexible screen to switch between the flat shape and the curved shape, the power mechanism comprising:
  a telescoping arm;
  a telescoping power unit coupling the telescoping arm for driving the telescoping arm elongating and contracting following the horizontal direction; and
  a positioning socket connected to the flexible screen for installing the telescoping power unit, comprising:
   two positioning bars arranged on upper and lower sides of the positioning socket to limit a vertical movement of the telescoping arm.

10. The TV set according to claim 9, wherein, the telescoping arm comprises a first telescoping arm and a second telescoping arm with a same structure, arranged in parallel; the telescoping power unit is arranged in between the first telescoping arm and the second telescoping arm.

11. The TV set according to claim 10, wherein, the first telescoping arm comprises a first rack having a first teeth and the second telescoping arm comprises a second rack having a second teeth; the first rack and the second rack are arranged on a pair of opposite faces of the first telescoping arm and the second telescoping arm respectively; and a worm drive unit, applied to driving the first rack and the second rack to make a reverse movement.

12. The TV set according to claim 11, wherein, the worm drive unit comprises a worm and a worm gear matching each other; a gear, extending to and arranged at the center of the worm gear, applied to intermeshing with the first rack and the second rack for driving.

13. The TV set according to claim 12, wherein, the power mechanism is fixed by a plurality of screws to a center of one side of the flexible screen; there are a plurality of screw columns with a same height arranged in the flexible screen, applied to keeping a curvature of the flexible screen consistent in bending; the position socket is configured to fix the worm and the worm gear, a height of the positioning socket equals to the height of the screw columns.

14. The TV set according to claim 13, wherein, a plurality of first through holes and second through holes are arranged in the telescoping arm alternatively, applied for the screws to penetrating; the first through holes are arranged in one end of the telescoping arm away from the telescoping power unit, and an inner surface of the first through hole fits to an outer surface of the screw; a plurality of the second through holes are arranged between one end of the telescoping arm close to the telescoping power unit and the first through holes alternatively, while the second through holes are wider than an external diameter of the screw.

* * * * *